United States Patent

[11] 3,596,169

| | | |
|---|---|---|
| [72] | Inventor | Marion L. Snedeker<br>Cleveland, Ohio |
| [21] | Appl. No. | 866,954 |
| [22] | Filed | Oct. 16, 1969 |
| [45] | Patented | July 27, 1971 |
| [73] | Assignee | Victoreen Leece Neville, Inc.<br>Cleveland, Ohio |

[54] REGULATING CIRCUIT EMPLOYING A SATURABLE REACTOR
12 Claims, 1 Drawing Fig.

[52] U.S. Cl. .................................................... 322/27,
322/73, 322/75, 323/89 R
[51] Int. Cl. ................................................. H02p 9/30
[50] Field of Search ........................................ 322/73, 75,
28, 25, 27; 323/40, 70, 89 R, 89 C

[56] References Cited
UNITED STATES PATENTS
3,054,044   9/1962   Shevel, Jr. ..................... 323/70 X 3,499,168   3/1970   Dinger.......................... 322/28

*Primary Examiner*—Oris L. Rader
*Assistant Examiner*—H. Huberfeld
*Attorney*—Yount and Tarolli ABSTRACT: A circuit having a toroidal saturable reactor with a winding on a core which is magnetically coupled to a conductor through which a direct-current load current is flowing for limiting the load current to a predetermined value. A winding on the saturable reactor is connected in series with an oscillator and a rectifying device is coupled to the series combination of the oscillator and the winding to develop a direct-current control voltage which is dependent on the load current. The control voltage from the rectifying device controls a circuit which in turn controls the current that is supplied to the field winding of a direct-current generator, or an alternating-current alternator which is coupled to a rectifier, thereby controlling the direct-current generator or alternator-rectifier so as to limit the load current to a predetermined value.

PATENTED JUL 27 1971
3,596,169
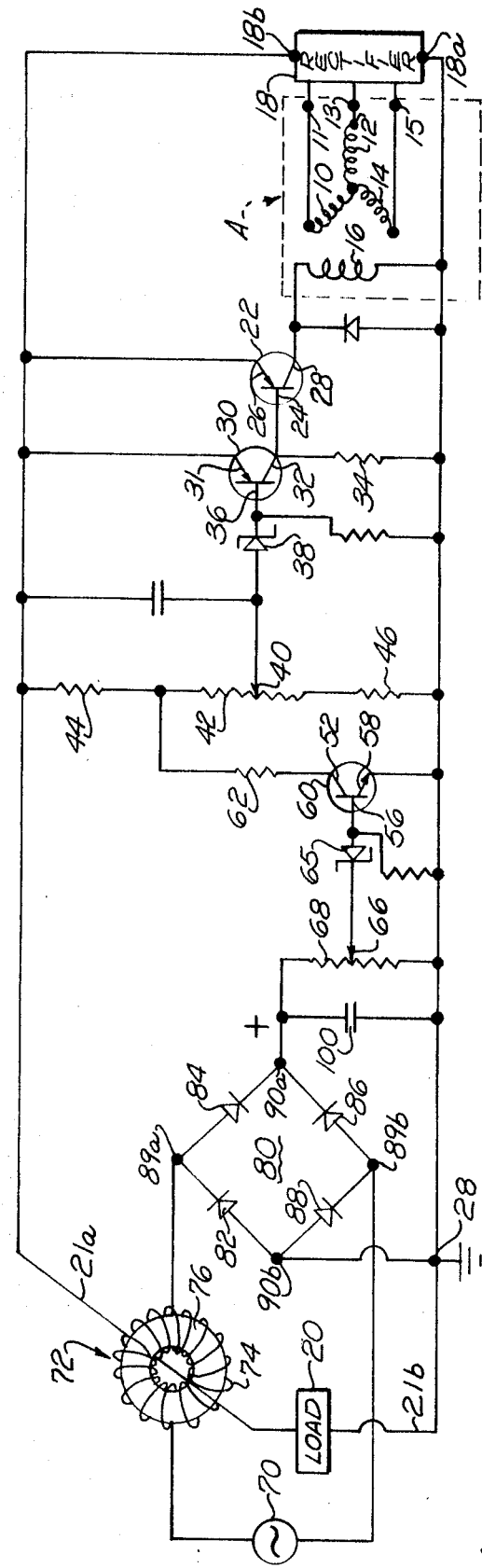
INVENTOR
MARION L. SNEDEKER
BY Yound and Tarolli
ATTORNEYS

REGULATING CIRCUIT EMPLOYING A SATURABLE REACTOR

The present invention is suitable for use in various types of electrical systems, and it is particularly suitable for use in vehicle electrical systems such as those employed in automobiles, trucks, buses, etc., for controlling load current produced by a direct-current generator or by the rectified output of an alternating-current alternator-rectifier system so as to limit the load current to a predetermined magnitude.

An object of the present invention is to provide a new and improved electric generating system having load current control in which the magnetic field of the load current varies the magnetic saturation of a core to in turn vary the impedance of a coil thereon energized by a periodically varying signal to provide a control signal for effecting a control of the load current.

A further object of the present invention is to provide a new and improved generating system in which a load current sensing circuit operates to turn the field current of a generating machine off and on as the load current rises to and falls from a maximum desired level, the circuit including a coil whose impedance is varied in response to the load current to turn on a semiconductor to turn off field current to the machine at the maximum desired load current level and to turn off the semiconductor when the current drops from the level.

A still further object of the present invention is to provide a current sensing circuit in which the impedance of a coil controls the magnitude of a control signal derived from a periodic voltage source energizing the coil and in which the impedance of the coil is varied by the effect of the magnetic field of the current being sensed on a saturable core for the coil.

The FIGURE is a schematic diagram which shows an embodiment of the circuit of the present invention in combination with an alternating-current alternator-rectifier system.

Referring to the FIGURE, the invention as shown is embodied in an alternating-current alternator-rectifier system for supplying direct-current power for a vehicle electrical system. A direct-current generator could alternatively be employed in combination with the control circuit of the present invention in place of the alternator-rectifier system if desired. The system as shown comprises an alternator A having a stator comprised of wye connected phase windings 10, 12, 14 and a field winging 16. A delta connected stator could also be employed, if desired. The output of the alternator A is rectified by a rectifier 18, which may be conventional six diode rectifier, that has its input terminals 11, 13 and 15 connected to the phase windings 10, 12 and 14 and its output terminals 18a and 18b connected to supply direct-current to a load circuit 20 which is connected by the conductors 21a and 21b. The current through the field winding 16 control the voltage at the output terminals 18a and 18b of the rectifier 18.

The field current that flows in the field winding 16 is switched on and off to control the output of the alternator-rectifier unit by switching a PNP transistor 22, which is coupled in series with the field winding 16, off and on. Alternatively, a fixed or variable resistor may be switched into series with the field winding 16 by the transistor 22 or other switching device, if desired. The transistor 22 has a base 24, an emitter 26 and a collector 28. The transistor 22 is switched off when the voltage across the rectifier terminals 18a and 18b exceeds a predetermined amount by a PNP transistor 30. The transistor 30 has an emitter 31 connected to the positive terminal 18b of the rectifier 18, a collector 32 coupled through a load resistor 34 to the negative terminal 18a of the rectifier 18 and a base 36 connected to the Zener diode 38. The collector 32 of the transistor 30 is also connected to the base 24 of the transistor 22 so that when the transistor 30 is switched on the transistor 22 is switched of and when transistor 30 is switched off, the transistor 22 is switched on.

A Zener diode 38 is connected to a sliding tap 40 of a potentiometer 42 which is coupled to the positive terminal 18b of the rectifier 18 through a resistor 44 and to the negative terminal 18 through a resistor 46. When the voltage across the terminals 18a and 18b of the rectifier 18 rises to the desired maximum level, the Zener diode 38 breaks down to switch the transistor 30 on to switch the transistor 22 off to block current through the field winding 16 and thereby decrease the output voltage and the load current supplied by the rectifier 18. When the voltage across the terminals 18a and 18b falls below the desired predetermined maximum voltage to a lower voltage, the Zener diode 38 again become nonconductive and it switches the transistor 30 off which in turn switches the transistor 22 on and field current is again supplied to the field winding 16.

From the foregoing it is apparent that the voltage at the sliding tap 40, relative to the positive terminal 18b of the rectifier 18, determines the voltage at which the transistor 30 switches on or off to control the field current flow through the field winding 16. Therefore, the circuitry which comprises the Zener diode 38 and the transistors 22 and 30 form a voltage-responsive circuit which controls the load voltage. Adjustment of the sliding tap 40 of the potentiometer 42 will apply a greater or less portion of the total output voltage to the Zener diode 38 and this will accordingly cause the transistor 30 to switch on at a lower or a higher positive voltage, respectively.

The present invention relates to circuit means for controlling the load current to limit it to a desired maximum value which is adjustable. In the illustrated embodiment an alternating-current oscillator 70, or other source of a periodically varying waveform, which has a substantially constant maximum output voltage amplitude and preferably a substantially constant frequency is connected in series with a winding 74 which is wound on a core 76 of the toroidal saturable reactor 72. The series combination of the oscillator 70 and the winding 74 are preferably connected to input terminals 89a and 89b of a full-wave rectifier bridge 80. A capacitor may be coupled in parallel with the winding 74 to form an antiresonant circuit to increase the impedance presented to the oscillator 70 at a given frequency, if desired. The electrical conductor 21a which passes through the center of the saturable reactor 72 is magnetically coupled to the core 76 by the magnetic field produced by the load current. The magnitude of the direct-current load current flowing in the conductor 21a determines the degree of saturation of the saturable reactor 72 and the impedance of the winding 74 to the periodically varying waveform from the oscillator 70, which impedance varies inversely with the magnitude of the load current.

The full-wave rectifier 80 is a conventional bridge-type rectifier that is formed of the rectifying diodes 82, 84, 86 and 88. A half-wave rectifier or other type of device to develop a control voltage which is representative of the electrical waveform produced by the oscillator 70 may also be substituted for the bridge rectifier 80 that is shown in the FIGURE. The potentiometer 68 is connected across the output terminals 90a and 90b of the bridge rectifier 80. The terminal 90b of the rectifier 80 is connected to ground and the terminal 90a is connected to the positive side of the potentiometer 68. A smoothing capacitor 100 may be connected in parallel with the potentiometer 68 to smooth the output voltage of rectifier 80.

The magnitude of the voltage which appears across the output terminals 90a and 90b is dependent upon the impedance of the winding 74 of the saturable reactor 72. When the impedance of the winding 74 is relatively large, the magnitude of the positive voltage which appears across the output terminals 90a and 90b will be relatively small and when the impedance of the winding 74 is relatively small, the magnitude of the positive voltage which appears across the output terminals 90a and 90b will be relatively large.

The transistor 52 has a base 56, a collector 60, which is connected through a resistor 62 to the junction point of the resistors 42 and 44, and an emitter 58, which is connected to the negative or ground terminal 18b of the rectifier 18. When the magnitude of the positive voltage which appears on the sliding tap 66 of the potentiometer 68 is relatively small, the Zener diode 65 is in its nonconductive state and the transistor 52 is off, and therefore, no current flows through the circuit comprising the transistor 52 and resistor 62.

The transistor 52, however, is driven on when the load current is at its desired maximum magnitude and the positive voltage which appears on the tap 66 is large enough to switch the Zener diode 65 into its low impedance state. When the load current through the load conductors 21a and 21b reaches its desired magnitude and the NPN transistor 52 is switched on, the positive potential at the sliding tap 40 will be decreased because of the increased voltage drop through resistor 44 causing the transistor 30 to turn on, and the transistor 22 to turn off, deenergizing the field winding 16. The output voltage across the terminal 18a and 18b will now drop, and therefore, the current through the load 20 will also drop. The impedance of the toroidal reactor will then increase reducing the voltage applied to the rectifying diodes 82, 84, 86 and 88 and consequently decreasing the voltage appearing at sliding tap 66. The voltage at the sliding tap 66 will then be less than the breakdown voltage of Zener 65 and as a result, the transistor 52 will be turned off. Consequently, the voltage drop across resistor 44 will be reduced, transistor 30 will turn off, transistor 22 will turn on, field winding 16 will be energized, thereby increasing the voltage across the terminals 18a and 18b so the load current increases. This sequence of events occurs very rapidly, resulting in a rapid off-on energization condition of the field winding which determines the maximum load current value over a considerable range according to the setting of the sliding tap 66. The circuit of the FIGURE may be modified by conventional design techniques so that the voltage developed at the sliding tap 66 may alternately be employed to continuously vary the current in the field winding 16 rather than to turn it repeatedly on and off, if desired.

Having described a preferred embodiment of my invention, the following is claimed:

1. In a direct-current electrical system, comprising direct-current power-source means and a load conductor connecting the power-source means to a direct current load circuit, a saturable reactor comprising a winding on a core which is magnetically coupled to the load conductor, source means coupled in series with the winding for energizing the winding with a periodically varying electrical waveform so that a signal voltage which is a function of the load current that flows through the load conductor is provided through the winding and regulating means responsive to the signal voltage for controlling the output of the power-source means.

2. A direct-current electrical system as defined in claim 1 wherein the saturable reactor is a toroid and the load conductor passes through the toroid.

3. A direct-current electrical system as defined in claim 1 wherein a means is connected to the winding of the saturable reactor developing a control voltage which controls the regulating means.

4. A direct-current electrical system as defined in claim 3 wherein the saturable reactor is a toroid and the load conductor passes through the toroid.

5. A direct-current electrical system as defined in claim 1 wherein the regulating means comprises a bistate switching means that is in a first state when the load current is below a predetermined value and in a second state when the load current is of the predetermined value and energization of the power-source means is reduced when the bistate switching means is in the second state.

6. A direct-current electrical system as in claim 5 wherein the saturable reactor is a toroid and the load conductor passes through the toroid.

7. A direct-current system as defined in claim 3 wherein the regulating means comprises a bi-state switching means that is in a first state when the load current is below a predetermined value and in a second state when the load current is of the predetermined value and energization of the power-source means is reduced when the bistate switching means is in the second state.

8. A direct-current electrical system as in claim 7 wherein the saturable reactor is a toroid and the load conductor passes through the toroid.

9. A circuit for regulating a rotatable voltage source which supplies direct current power to a direct-current load circuit and which has a field winding, comprising a regulating means coupled to the field winding, a saturable reactor comprising a winding on a core, a source of periodically varying electrical waveforms of a substantially constant magnitude coupled in series with the winding, a conductor electrically coupled to carry the direct current load current and magnetically coupled to the core of the saturable reactor so that the impedance of the winding varies with the load current and means coupled to the source of electrical waveforms and to the winding for developing a control voltage which is coupled to the regulating means for controlling the current flowing in the field winding.

10. A regulating circuit as in claim 9 wherein the saturable reactor is a toroid and the load conductor passes through the toroid.

11. A circuit for controlling a rotatable voltage source which supplies direct current power to a direct-current source load circuit and which has a field winding, comprising a regulating means comprising a switching means which has a low resistance path coupled in series with the field winding of the rotatable source when the switching means is on and a high resistance path coupled in series with the field winding when the switching means is off, means for switching the switching means off when flowing load voltage is of a predetermined level to reduce the field current of the rotatable source, a saturable reactor comprising a winding on a core, a source of a periodically varying electrical waveform of a substantially constant magnitude coupled in series with the winding, a conductor electrically coupled to carry the load current and magnetically coupled to the core of the saturable reactor so that the impedance of the winding varies with load current and means for developing a control voltage which is coupled to the regulating means to switch the switching means off when a predetermined magnitude of current is flowing in the load conductor.

12. In an electric-generating system, including generating means having an output for supplying a direct current, said generating means including a field coil to be energized to produce a direct current output, and a load conductor connected to said output, means for limiting the current in said load conductor comprising a saturable magnetic core adjacent said conductor and in the magnetic field of current in said conductor, a winding on said core, a source of a periodically varying voltage wave of substantially constant amplitude, circuit means connecting said source and said winding to derive a direct current control voltage dependent on the impedance of said winding with respect to said voltage wave, the impedance of said winding varying with the effect of the magnetic field of the load current on said core, comprising a potentiometer across which said control voltage is developed said potentiometer having a sliding tap, semiconductor switching means connected to said tap and switched to one state in response to a voltage of a predetermined level at said tap to turn off current in said field coil and switched to a second state to turn on current to said field coil when said control voltage falls from its said predetermined level.